United States Patent
Beyrak

(10) Patent No.: US 6,554,014 B2
(45) Date of Patent: Apr. 29, 2003

(54) PROPORTIONAL PILOT OPERATED DIRECTIONAL VALVE

(75) Inventor: Yakov Beyrak, Glenview, IL (US)

(73) Assignee: HydraForce, Inc., Lincolnshire, IL (US)

( * ) Notice: Subject to any disclaimer, the term of this patent is extended or adjusted under 35 U.S.C. 154(b) by 0 days.

(21) Appl. No.: 09/971,168

(22) Filed: Oct. 4, 2001

(65) Prior Publication Data
US 2002/0043287 A1 Apr. 18, 2002

Related U.S. Application Data
(60) Provisional application No. 60/240,448, filed on Oct. 13, 2000.

(51) Int. Cl.$^7$ .............................................. F15B 13/042
(52) U.S. Cl. .................. 137/1; 137/454.5; 137/625.66; 137/625.68
(58) Field of Search .................... 137/1, 454.5, 625.66, 137/625.68

(56) References Cited

U.S. PATENT DOCUMENTS

| | | | | |
|---|---|---|---|---|
| 3,922,955 A | * | 12/1975 | Kast ...................... | 137/625.68 |
| 4,491,154 A | | 1/1985 | Peters | |
| 4,664,152 A | * | 5/1987 | O'Mara ................. | 137/625.68 |
| 5,172,727 A | * | 12/1992 | Stoll et al. ............ | 137/625.68 |
| 5,236,001 A | | 8/1993 | Kleles | |
| 5,445,188 A | * | 8/1995 | Bourkel et al. ........ | 137/625.68 |
| 5,878,782 A | * | 3/1999 | Nakajima .............. | 137/625.68 |
| 5,901,749 A | | 5/1999 | Watson | |
| 6,041,819 A | | 3/2000 | Walleman | |

FOREIGN PATENT DOCUMENTS

| | | |
|---|---|---|
| GB | 831611 A | 3/1960 |
| GB | 1 103 143 A | 2/1968 |

OTHER PUBLICATIONS

European Search Report for EP 01 25 0356.

* cited by examiner

Primary Examiner—Gerald A. Michalsky
(74) Attorney, Agent, or Firm—Leydig, Voit & Mayer, Ltd.

(57) ABSTRACT

A proportional, pilot-operated directional valve has a sleeve with at least four sets of radial holes, and a spool disposed within the sleeve, with a channel being defined between the spool and the sleeve. The spool has at least two sets of radial holes, and the exterior surface of the spool has annular protrusions, each being in at least partial contact with the inner wall of the sleeve. When the valve is in an open position, the first set of radial holes of the sleeve is in communication with one of the two sets of radial holes of the spool, the second and third sets of radial holes of the sleeve are each at least in partial communication with the channel, and the fourth set of radial holes of the sleeve is in communication with the other of the two sets of radial holes of the spool. The spool may be kept in an open position by pressure from a flow of fluid that is provided at one end of the sleeve.

37 Claims, 8 Drawing Sheets

PROPORTIONAL PILOT OPERATED DIRECTIONAL VALVE

CROSS REFERENCE TO RELATED APPLICATIONS

This application claims priority of U.S. Provisional Application No. 60/240,448 for a Proportional Pilot Operated Directional Valve, filed Oct. 13, 2000.

TECHNICAL FIELD

The invention relates generally to pilot operated directional valves and, more particularly, to cartridge style proportional pilot operated directional valves that allow flow to be regulated proportionally to the pilot pressure.

BACKGROUND

Proportional pilot operated valves come in several different styles. These include surface mounted valves, so-called CETOP valves, and sectional valves. However, a cartridge style version of a proportional pilot operated valve has not been generally available. A cartridge style valve is advantageous in that it can be used in a single compact manifold together with many other valves to enable full hydraulic control of a machine. Furthermore, cartridge style valves tend to be more cost effective than the previously mentioned types.

SUMMARY

In accordance with the foregoing, a novel valve is provided. In an embodiment of the invention, the valve has a sleeve with at least four sets of radial holes, and a spool disposed within the sleeve, with a channel being defined between the spool and the sleeve. The spool has at least two sets of radial holes, and the exterior surface of the spool has annular protrusions, each being in at least partial contact with the inner wall of the sleeve. When the valve is in an open position, the first set of radial holes of the sleeve is in communication with one of the two sets of radial holes of the spool, the second and third sets of radial holes of the sleeve are each in communication with the channel, and the fourth set of radial holes of the sleeve is in communication with the other of the two sets of radial holes of the spool. The spool may be kept in an open position by pressure from a flow of fluid that is provided at one end of the sleeve.

In an embodiment of the invention, the valve has a cap with an axial bore and a radial hole, in which an end of the sleeve is disposed inside the axial bore of the cap and is connected to the cap. The radial hole of the cap communicates with the axial bore of the cap, and a fluid path is defined from the radial hole of the cap, through the axial bore of the cap, and to the spool. Pressure from a fluid entering the radial hole of the cap may put the valve into the second open position, in which the first and second sets of radial holes of the sleeve are at least in partial communication with the channel, the third set of radial holes of the sleeve is at least in partial communication with one of the two sets of radial holes of the spool, and the fourth set of radial holes of the sleeve is in communication with the other of the two sets of radial holes of the spool.

An embodiment of the invention includes a means for biasing the spool into a neutral position, in which one or more of the annular protrusions of the spool blocks the first set and third sets of radial holes of the sleeve. In various embodiments of the invention, the biasing means is a spring.

During operation of an embodiment of the present invention, a first open position is provided by admitting a fluid through the second set of radial holes of the sleeve and through the channel to the third set of radial holes of the sleeve. The fluid is then allowed to exit the valve at the third set of radial holes of the sleeve and to pass to a hydraulic device. The fluid is further admitted from an outlet of the hydraulic device, through the first set of radial holes of the sleeve, and to the axial bore of the spool. The fluid is then passed through the axial bore of the spool, to the fourth set of radial holes of the sleeve, and allowed to exit the valve at the fourth set of radial holes of the sleeve.

A second open position of an embodiment of the present invention is provided by admitting a fluid through the second set of radial holes of the sleeve and through the channel to the first set of radial holes of the sleeve. The fluid is then allowed to exit the valve at the first set of radial holes of the sleeve and to pass to a hydraulic device. The fluid is further admitted from an outlet of the hydraulic device, through the third set of radial holes of the sleeve, to the axial bore of the spool. The fluid is then passed through the axial bore of the spool, to the fourth set of radial holes of the sleeve and allowed to exit the valve at the fourth set of radial holes of the sleeve.

Other features of the invention are described in, and will be apparent from the following description and the annexed drawings.

DETAILED DESCRIPTION

Figure 1:
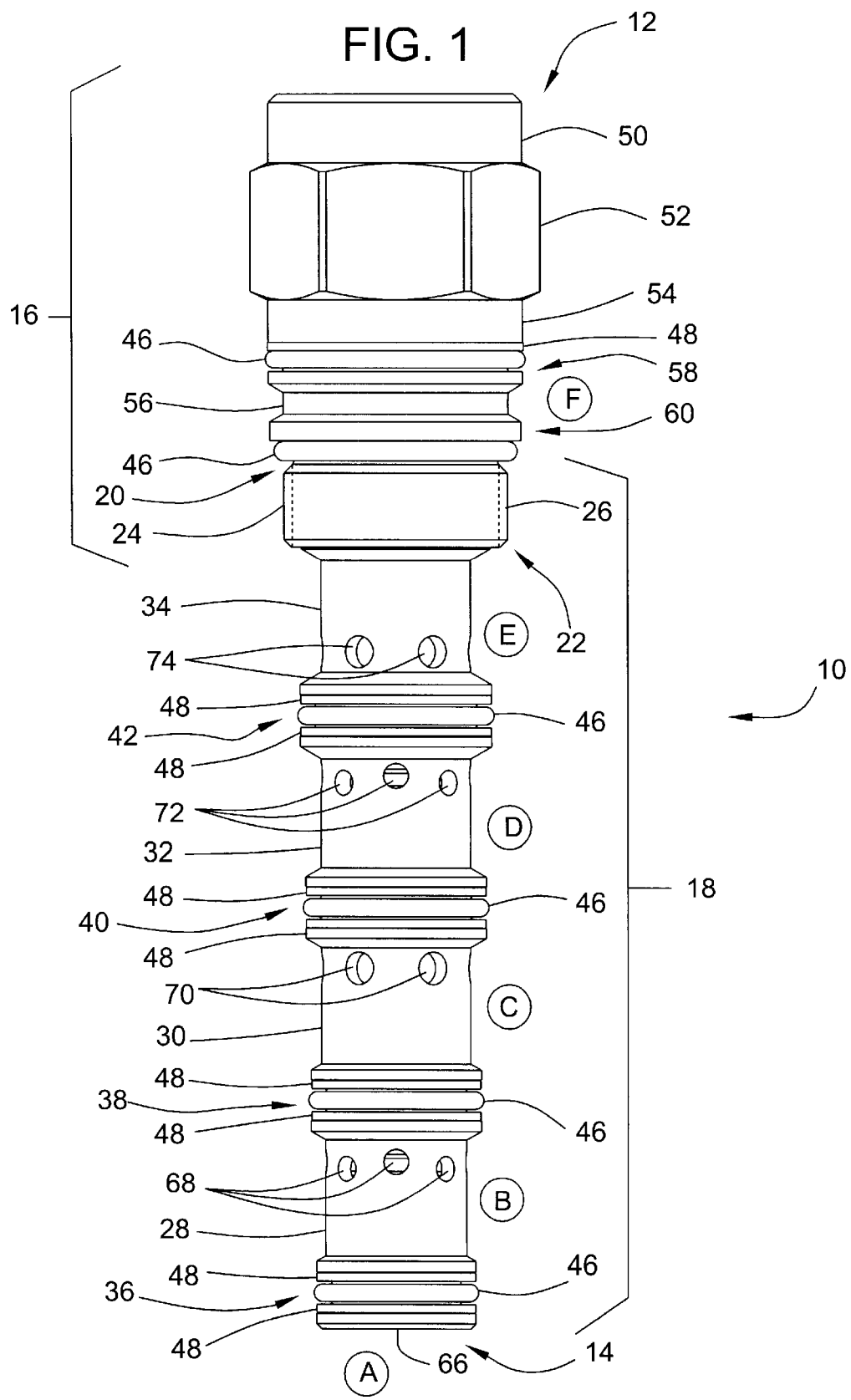
FIG. 1 is an exterior view of a valve implemented according to an embodiment of the invention.
Figure 2:
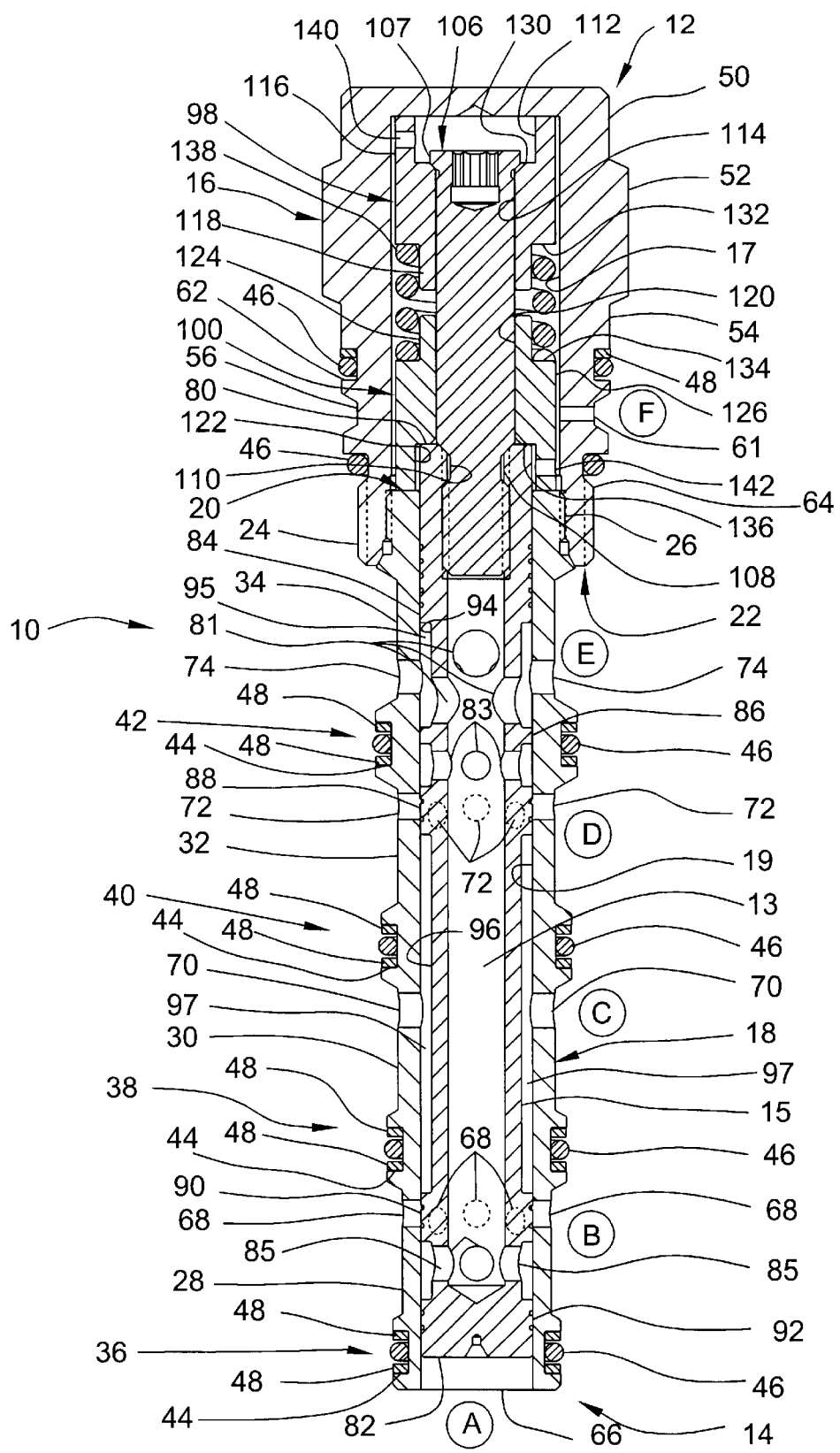
FIG. 2 is cross-sectional view of a valve implemented according to an embodiment of the invention, in which the spool is in a neutral position.

A valve configured according to an embodiment of the invention is shown in FIGS. 1 and 2, with FIG. 2 depicting a cross sectional view of the valve in a neutral position. The valve, generally labeled 10, is generally cylindrical in shape and has a first end 12, which is closed, and a second end 14, which is open. The valve 10 includes a cap 16, an elongated and a generally tubular sleeve 18 secured to the cap 16. The sleeve 18 has an axial through bore 19 (FIG. 2), a first end 20 and a second end. The second end of the sleeve 18 is the same as the second end 14 of the valve 10, and will be referred to with reference number 14 as well. The valve 10 also includes a generally tubular, movable member, such as a spool 15 (FIG. 2) disposed within the bore 19. The features of the spool 15 will be described in further detail below. The cap 16 has a first end, which is closed and a second end 22. The first end of the cap 16 is the same as the first end 12 of the valve 10 and will be referred to with the same reference number. At the second end 22 of the cap 16 is a first connecting portion 24, while at the first end 20 of the sleeve 18 is a second connecting portion 26. The first and second connecting portions 24 and 26 are connected together, with the second connecting portion 26 of the sleeve 18 being inside the first connecting portion 24 of the cap 16, so that the cap 16 and the sleeve 18 are fixed relative to one another.

The wall of the sleeve 18 has four generally straight tubular sections. Starting from the second end 14 of the sleeve 18, the generally straight tubular sections comprise a first section 28, a second section 30, a third section 32 and a fourth section 34. The fourth generally straight tubular section 34 is located next to the connecting portion 26 of the sleeve 18. The wall of the sleeve 18 also has four flared tubular sections. A first flared tubular section 36 is located at the second end 14 of the sleeve 18. A second flared tubular section 38 is located between the first and second generally straight tubular sections 28 and 30. A third flared tubular section 40 is located between the second and third generally straight tubular sections 30 and 32. Finally, a fourth flared tubular section 42 is located between the second and third generally straight tubular sections 32 and 34. Each of the first, second, third and fourth flared tubular sections 36, 38, 40 and 42 has defined therein an annular groove 44, having seated therein an O-ring 46 between a pair of back-up rings 48.

The cap 16 has a first generally straight cylindrical portion 50 at its first end 12, a hexagonal portion 52 next to the first generally straight cylindrical portion 50, and a second generally straight cylindrical portion 54 next to the hexagonal portion 52. The wall of the cap 16 has a generally straight tubular section 56, a first flared section 58 on one side of the generally straight tubular section 56 (closest to the second generally straight cylindrical portion 54), and a second flared section 60 on the other side of the generally straight tubular section 56 (closest to the second end 22 of the cap 16). The cap 16 has a first annular groove 62 (shown in FIG. 2) defined between the second generally straight cylindrical portion 54 of the cap 16 and the first flared section 58 of the cap 16. A back-up ring 48 and an O-ring 46 are seated within the first annular groove 62. The cap 16 also has a second annular groove 64 (shown in FIG. 2) defined between the second flared section 60 and the coupling section 26 of the cap 16. An O-ring 46 is seated within the second annular groove 64. The generally straight tubular section 56 of the cap 16 has a radial hole 61 (shown in FIG. 2).

The axial through bore 19 (FIG. 2) of the sleeve 18 has an opening 66 at its second end 14. Each of the generally straight tubular sections of the wall of the sleeve 18 has sets of radial holes, which communicate with the axial through bore 19. The first generally straight tubular section 28 of the wall of the sleeve 18 has a first set of radial holes 68. The second generally straight tubular section 30 of the wall of the sleeve 18 has a second set of radial holes 70. The third generally straight tubular section 32 of the wall of the sleeve 18 has a third set of radial holes 72. Finally, the fourth generally straight tubular section 34 has a fourth set of radial holes 74. While many other hole configurations are possible without departing from the spirit of the invention, the first set of radial holes 68 of the sleeve 18 are positioned in two offset and overlapping rows. Similarly, the third set of holes 72 of the sleeve 18 are positioned in two offset and overlapping rows. During operation of the valve 10, the opening 66 of the sleeve 18 communicates with a fluid passageway outside of the valve 10 to form a first port, referred to herein as port A. The generally straight tubular sections 28, 30, 32 and 34 of the sleeve 18 each communicate with different fluid passageways to form second, third, fourth and fifth ports, referred to herein as ports B, C, D and E. Similarly, the generally straight tubular section 54 of the cap 16 communicates with yet a different fluid passageway to form a sixth port, referred to herein as port F. During normal operation of the valve 10, the first port A functions as a first pilot port, the second port B functions as a first metering port, the third port C functions as an inlet port, the fourth port D functions as a second metering port, the fifth port E functions as an outlet port, and the sixth port F functions as a second pilot port. In an embodiment of the invention, the first and second pilot ports A and F are each connected to a respective pressure-reducing valve. By applying different pressures on each of these pilot ports, the pressure reducing valves can change the position of the spool 15.

Referring to FIG. 2, the spool 15 is movable along the axis of the bore 19 for selectively controlling a fluid flow through the sleeve 18. The spool 15 has a first end 80, which is open and is oriented towards the first end 12 of the valve 10, and second end 82, which is closed and oriented toward the second end 14 of the valve 10. The spool 15 also has an axial bore 13 that extends from the first end 80 of the spool 15 to the second end 82 of the spool 15, and an internal thread 108 at its first end 80. Additionally, the spool 15 has five annular protrusions. Starting from the first end 80 of the spool 15, these protrusions are: a first annular protrusion 84, a second annular protrusion 86, a third annular protrusion 88, a fourth annular protrusion 90, and a fifth annular protrusion 92, which is located at the second end 82 of the spool 15. The spool 15 also has a first cylindrical outer surface 94 that extends from the first annular protrusion 84 to the second annular protrusion 86, and a second cylindrical outer surface 96 that extends from the third annular protrusion 88 to the fourth annular protrusion 90. The first cylindrical outer surface 94 and the wall of the sleeve 18 defined a first channel 95, while the second cylindrical outer surface 96 and the wall of the sleeve 18 define a second channel 97. Finally, the spool 15 has three sets of radial holes. Starting from the first end 80 of the spool 15, the three sets of radial holes are: a first set of radial holes 81, a second set of radial holes 83, and a third set of radial holes 85.

In an embodiment of the invention, the spool 15 has a neutral position, a first open position and a second open position. As shown in FIG. 2, when the spool is in its neutral position, the first set of radial holes 68 of the sleeve 18 is blocked by the fourth annular protrusion 90 of the spool 15. Similarly, the third set of radial holes 72 of the sleeve 18 is blocked by the third annular protrusion 88.

Referring again to FIG. 2, the cap 16 has an axial bore 17. The valve 10 further includes a generally tubular first guide member 98 and a generally tubular second guide member 100 disposed within the axial bore 17 of the cap 16, with the first guide member 98 being closest to the first end 12 of the cap 16. The first guide member 98 has an axial through bore that extends from a first bore portion 112 to a second bore portion 114 whose diameter is smaller than that of the first bore portion 112. A step 130 extends laterally to, and defines a transition between the first bore portion 112 and the second bore portion 114 of the first guide member's axial through bore. The first guide member 98 is oriented so that the first bore portion 112 is closest to the first end 12 of the cap 16. The first guide member 98 also has a generally cylindrical outer surface that extends from a first cylindrical outer portion 116 to a second cylindrical outer portion 118 whose diameter is smaller than that of the first cylindrical outer portion 116. A step 132 extends laterally to, and defines a transition between the first cylindrical outer portion 116 and the second cylindrical outer portion 118 of the first guide member's generally cylindrical outer surface. The first guide member 98 also has a radial hole 140 that provides communication between the first bore portion 112 of the first guide member's axial bore and the axial bore 17 of the cap 16.

The second guide member 100 has an axial through bore that extends from a first bore portion 120 to a second bore portion 122 whose diameter is larger than that of the first bore portion 120. A step 134 extends laterally to, and defines a transition between the first bore portion 120 and the second bore portion 122 of the second guide member's axial through bore. The second guide member 100 is oriented so that the first bore portion 120 is closest to the first end 12 of the cap 16. The second guide member 100 also has a generally cylindrical outer surface that extends from a first cylindrical outer portion 124 to a second cylindrical outer portion 126 whose diameter is larger than that of the first cylindrical outer portion 124. A step 136 extends laterally to, and defines a transition between the first cylindrical outer portion 124 and the second cylindrical outer portion 126 of the second guide member's generally cylindrical outer surface. The second guide member 100 also has a radial hole 142 that provides communication between the second bore portion 122 of the first guide member's axial bore and the axial bore 17 of the cap 16.

A solid, cylindrical connecting member 106 passes through the axial through bores of the first and second guide members 98 and 100, and extends into the bore 13 of the spool 15. The connecting member 106 has an external thread 110 that engages the internal thread 108 of the spool 15, thus securing the connecting member 106 to the spool 15. The connecting member 106 also has an annular lip 107 located on a portion of the connecting member 106 that is disposed in the first bore portion 112 of the first guide member 98. The annular lip 107 abuts the step 130 of the first guide member 98 when the spool 15 is in the neutral position or in the second open position. A spring 138 is disposed annularly around the connecting member 106 between the step 132 of the first guide member 98 and the step 134 of the second guide member 100 and provides a force against the steps 132 and 134 of the first and second guide members that urges the second guide member 100 and the first guide member 98 away from each other, so that the first guide member 98 stops against the cap 16 and the second guide member 100 stops against the sleeve 18. In effect, the spring 138 biases the spool 15 into its neutral position.

The general modes of operation of the valve of the present invention will now be described. During a first open mode of operation of the valve, a pilot pressure is gradually increased at one of the pilot ports, thereby causing the spool to move proportionally to the applied pilot pressure in one direction to pass a fluid flow from the inlet port, through one of the metering ports, to a hydraulic actuator or motor and then through the other metering port, through the axial bore of the spool, and to the outlet port, with the flow rate being proportional to the applied pilot pressure. During a second open mode of operation, a pilot pressure is gradually increased at the other pilot port, thereby causing the spool to move proportionally to the applied pilot pressure in another direction to reverse the metering ports, so that the fluid flow passes to a hydraulic actuator or motor in a direction opposite to the flow of the first open mode, with the flow rate also being proportional to the applied pilot pressure.

Figure 3:
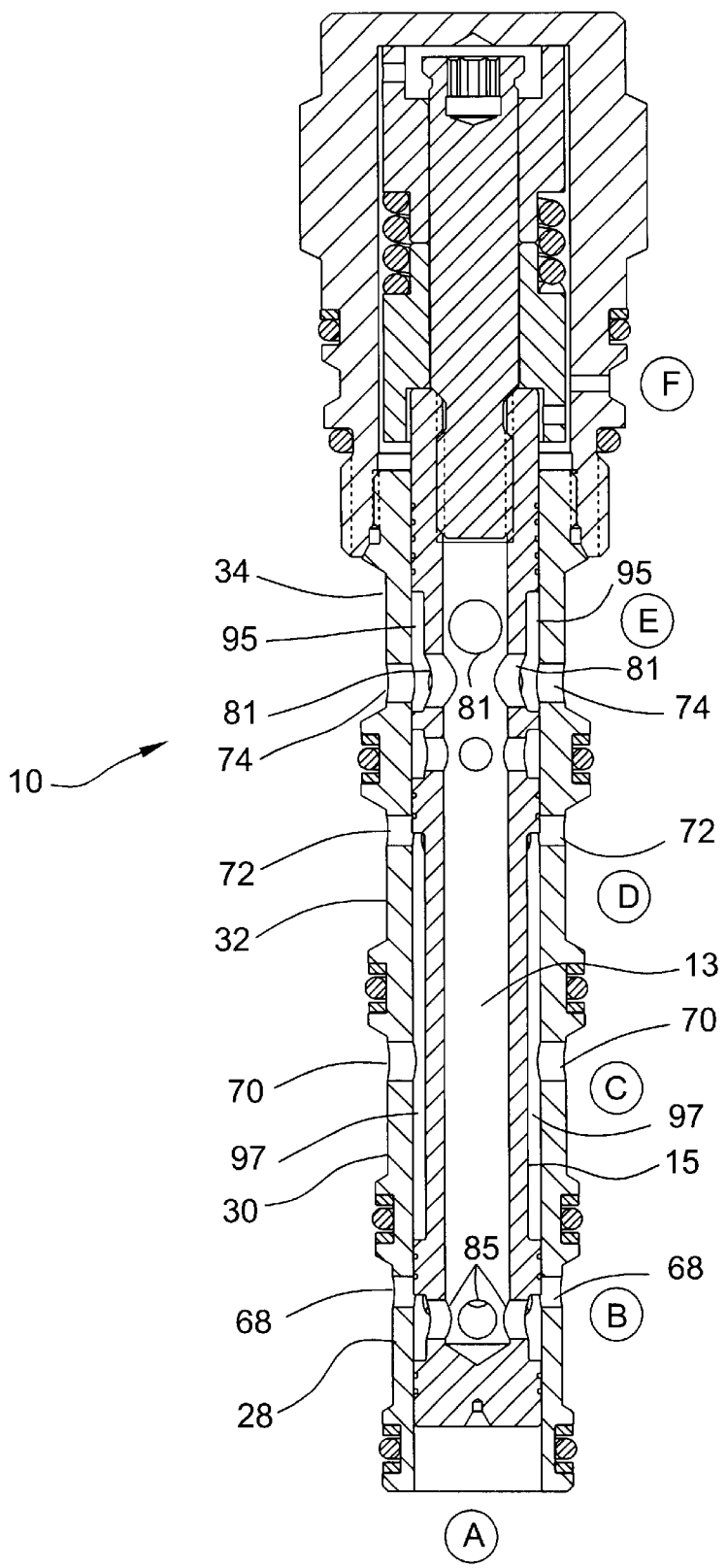
FIG. 3 is the cross-sectional view of FIG. 2, in which the spool is in an open position.

An example of how the valve 10 operates in the first open mode will now be described with reference to FIGS. 1, 2 and 3. It is assumed for this example that the third port C is used as an inlet port, the second port B is connected to a first port of a hydraulic motor or cylinder, and that the fourth port D is connected to a second port of the hydraulic motor or cylinder. When the spool 15 is moved up into its first open position so that the first set of radial holes 68 of the sleeve 18 is communicating with the spool's third set of radial holes 85, and the third set of radial holes 72 of the sleeve 18 are communicating with the second channel 97, fluid flows from the third port C, through the second set of radial holes 70 of the sleeve 18 through the second channel 97, through the third set of radial holes 72 of the sleeve 18, and out to the second port of the hydraulic motor or cylinder. Fluid then flows out of the first port of the hydraulic motor or cylinder and into the first set of radial holes 68 of the sleeve 18. The fluid further flows through the spool's third set of radial holes 85, through the axial bore 13 of the spool 15, and to the spool's first set of radial holes 81. The fluid then flows from the spool's first set of radial holes 81, through the first channel 95, and out through the fourth set of radial holes 74 of the sleeve 18.

Figure 4:
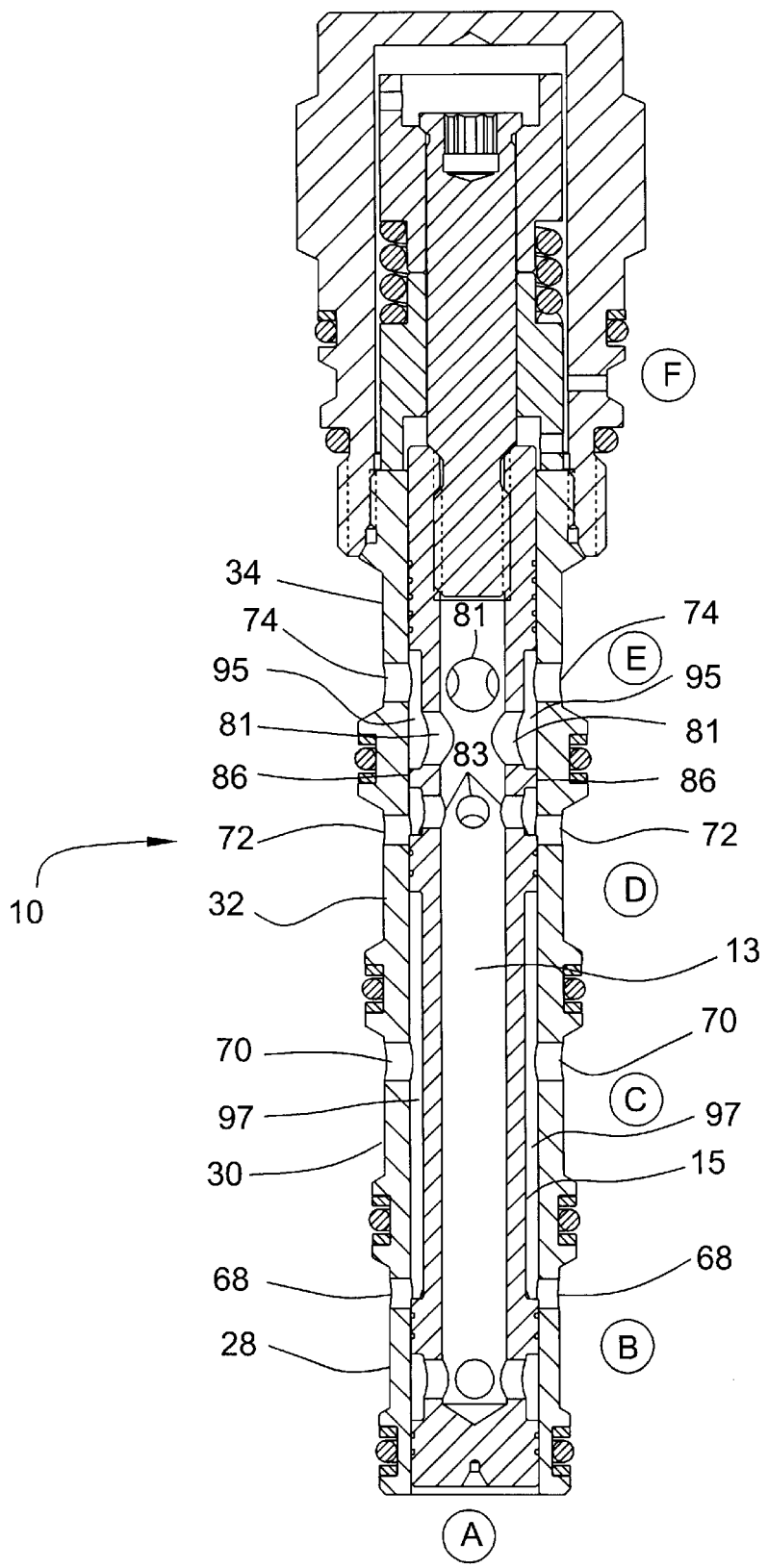
FIG. 4 is the cross-sectional view of FIG. 2, in which the spool is in another open position.

An example of the operation of the second open mode of the valve will now be described with reference to FIGS. 1, 2 and 4. As in the first open mode example, it is assumed for this example that the third port C is used as an inlet port, the second port B connected to the first port of a hydraulic motor or cylinder, and that the fourth port D is connected to the second port of the hydraulic motor or cylinder. When a pilot pressure is applied to the sixth port F, the spool moves down into its second open position so that the first set of radial holes 68 of the sleeve 18 are communicating with the second channel 97 and the third set of radial holes 72 of the sleeve 18 are communicating with the spool's second set of radial holes 83, and fluid flows from the inlet port (port C) through the second set of radial holes 70 of the sleeve 18 through the second channel 97, through the first set of radial holes 68 of the sleeve 18, and to the first port of the hydraulic motor or cylinder. The fluid then exits through the second port of the hydraulic motor or cylinder and passes through the third set of radial holes 72 of the sleeve wall 18, and through the spool's second set of radial holes 83. The fluid further flows from the spool's second set of holes 83, through the bore 13 of the spool 15, and through the spool's first set of radial holes 81. The fluid also passes through the spool's first set of radial holes 81, through the first channel 95 and out through the fourth set of radial holes 74 of the sleeve 18.

Figure 8:
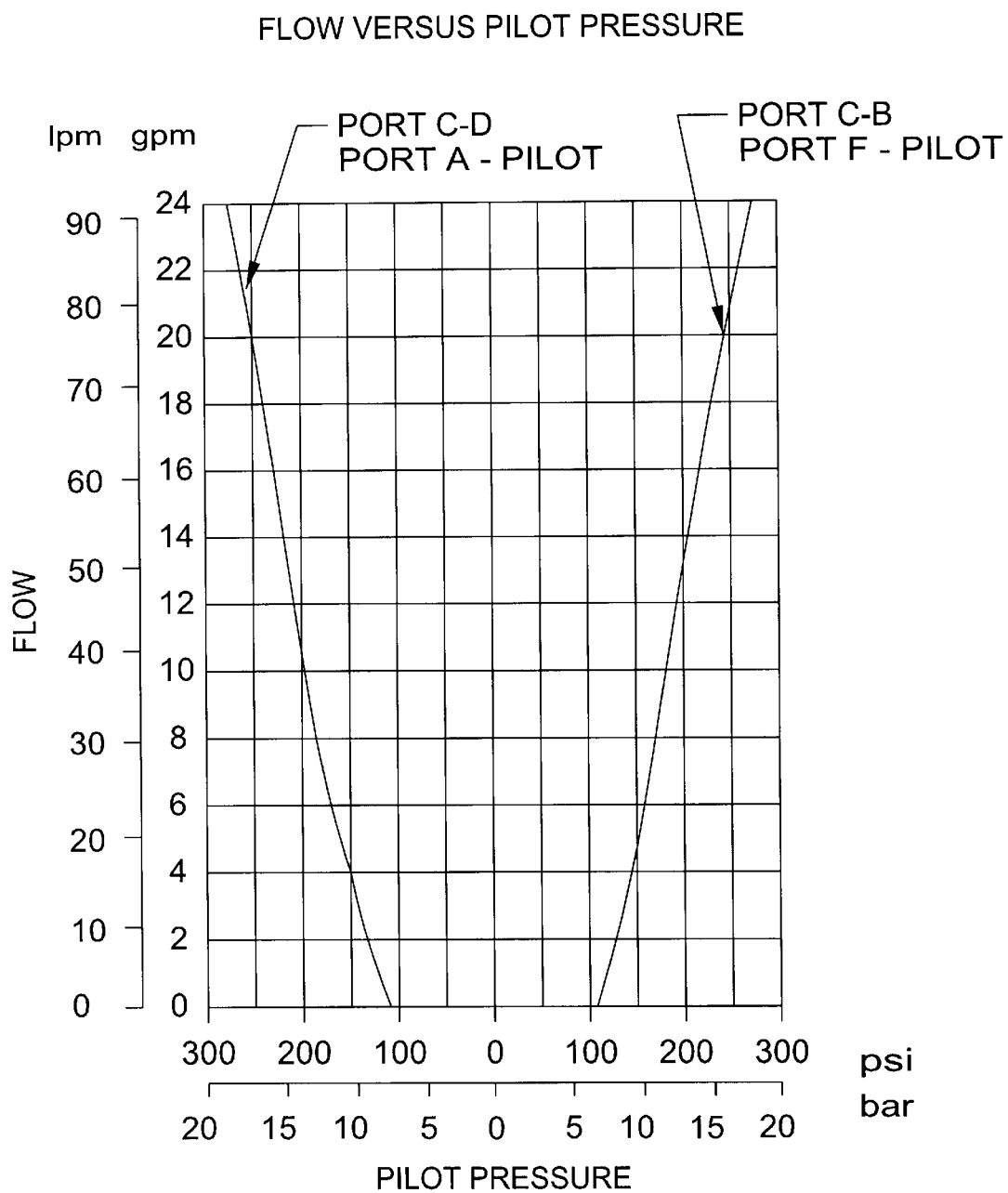
FIG. 8 is a graph showing an example of the flow versus pilot pressure characteristics of a valve implemented according to an embodiment of the invention.

According to an aspect of the invention, the second annular protrusion 86 of the spool and the second set of radial holes 83 of the spool force fluid to flow through the axial bore 13 so that flow rate versus pilot pressure characteristics exhibited during the movement of the spool from its neutral position (FIG. 2) to its first open position (FIG. 3) and the flow rate versus pilot pressure characteristics exhibited during the movement of the spool from its neutral position (FIG. 2) to its second open position (FIG. 4) are substantially identical. FIG. 8 illustrates this aspect of the invention using data obtained from one implementation of the invention.

Figure 5:
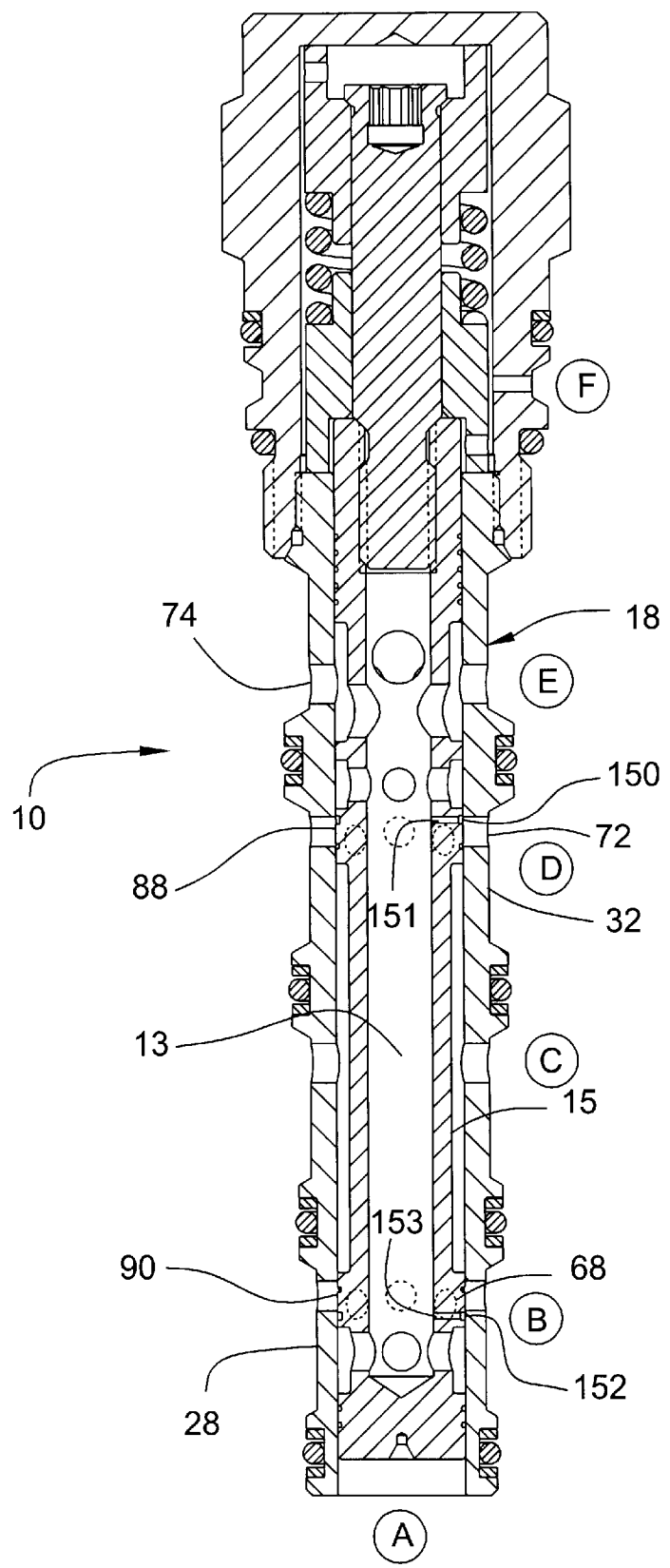
FIG. 5 is a cross-sectional view of alternative version of the valve of FIGS. 1 and 2.

There are a variety of possible configurations for the valve of the present invention. For example FIG. 5 shows a first alternate embodiment of the valve 10 of FIGS. 1 and 2 in which the third annular protrusions 88 of the spool 15 has a first annular groove 150, and in which the fourth annular protrusion 152 has a second annular groove 152. When the spool 15 is in its neutral position, the first annular groove 150 is at least partially aligned with the first set of radial valves 68 of the sleeve 18. Furthermore, a first small radial hole 151 is provided within the first annular groove 150, and a second small radial hole 153 is provided within the second annular groove 152. The first and second small radial holes 151 and 153 each communicate with the axial bore 13 of the spool 15. Thus, in the first alternate embodiment of the valve, ports B, D and E are in communication with one another via the first, third and fourth sets of radial holes 68, 72 and 74 of the sleeve 18; the first and second small radial holes 151 and 153; and the axial bore 13 of the spool 15. The exterior of the first alternate embodiment of the valve shown in FIG. 5 looks identical to that shown in FIG. 1.

Figure 6:
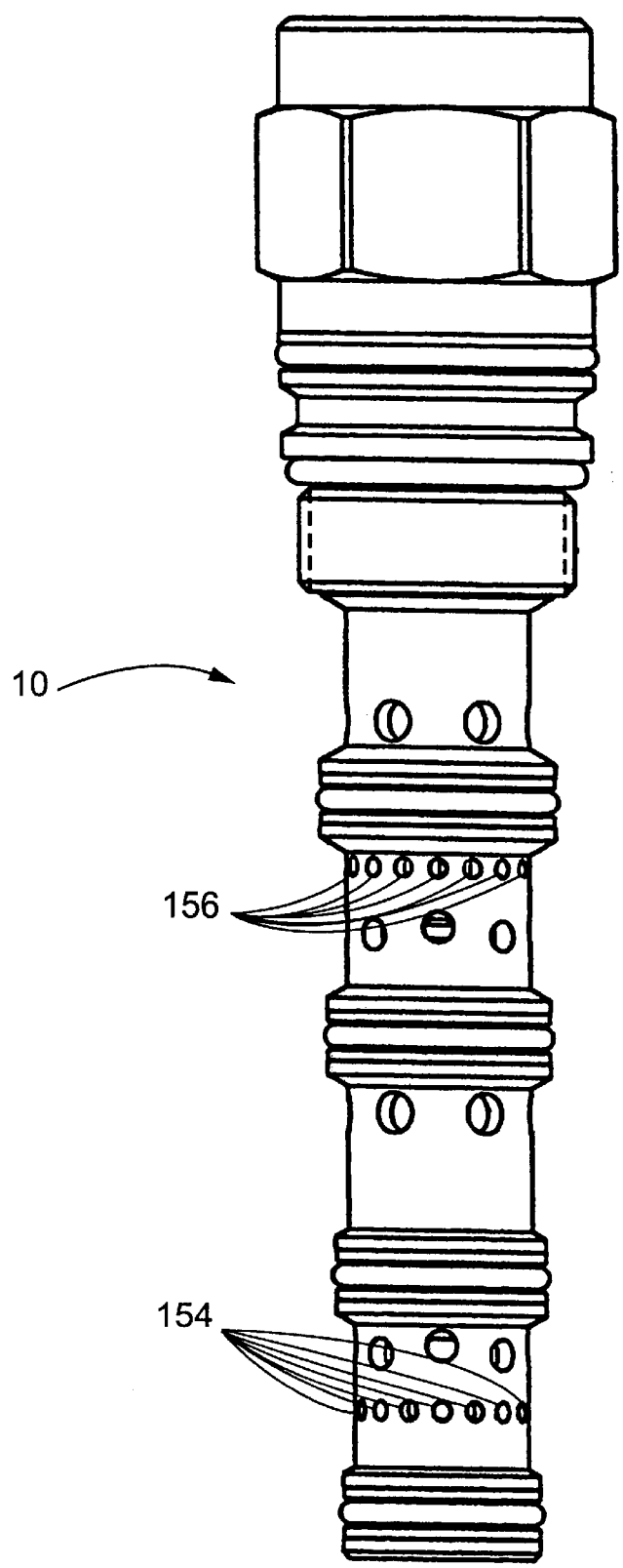
FIG. 6 is an exterior view of another alternative version of the valve of FIGS. 1 and 2.
Figure 7:
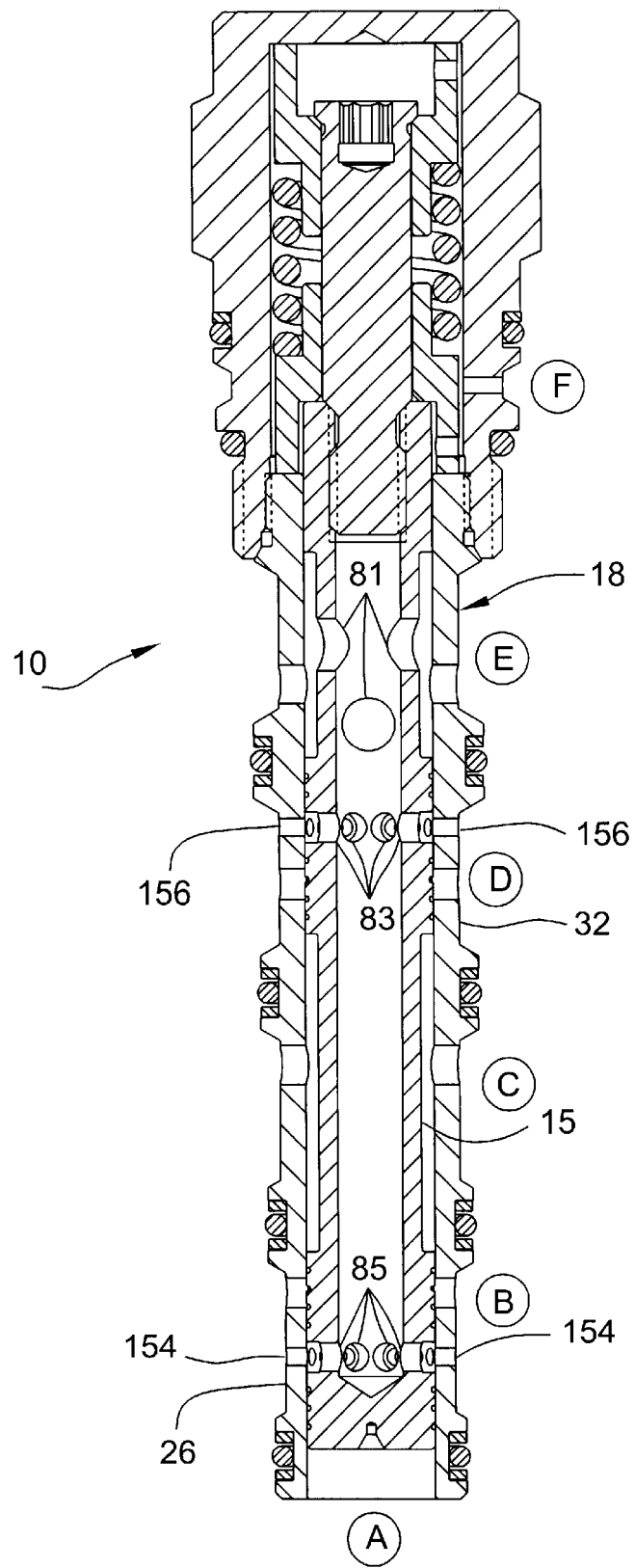
FIG. 7 is a cross-sectional view of the alternative version of FIG. 6.

Referring to FIGS. 6 and 7, a second alternative embodiment of the valve 10 of FIGS. 1 and 2 is shown, in which the first section 28 of the wall of the sleeve 18 includes a first set of auxiliary radial holes 154, and the third section 32 of the wall of the sleeve 18 includes a second set of auxiliary radial holes 156. When the valve 10 is in its neutral position, the first set of auxiliary holes 154 are aligned with the third set of radial holes 85 of the spool 15, while the second set of auxiliary holes 156 are aligned with the second set of radial holes 83 of the spool 15. Thus, in the second alternate embodiment of the valve, ports B, D and E are in communication with one another via the axial bore of the spool 15.

The valve described herein can be used in a variety of hydraulic applications. For example, it can be advantageously installed together with other different cartridge style valves in a single compact manifold to control the speed of a cylinder rod or a hydraulic motor when used in conjunction with a variable displacement pressure compensated pump.

What is claimed is:

1. A valve comprising:
a sleeve having a wall with an inner surface, the inner surface defining an axial bore;
a spool disposed within the axial bore of the sleeve, the spool having a wall with an inner surface, the inner surface defining an axial bore, the spool having an exterior surface, at least two sets of radial holes being defined in the wall of the spool, the two sets of radial holes at least partially communicating with the axial bore of the spool,
wherein the exterior surface of the spool comprises:
a generally cylindrical portion between the two sets of radial holes;
a plurality of annular protrusions, each being in at least partial contact with the inner surface of the wall of the sleeve, at least one of the plurality of annular protrusions being disposed between one of the two sets of radial holes and the generally cylindrical portion,
at least one of the plurality of annular protrusions being disposed between the other of the two sets of radial holes and the generally cylindrical portion,
wherein the generally cylindrical portion extends from about one of the plurality of annular protrusions to about another of the plurality of annular protrusions, and wherein the generally cylindrical portion, the annular protrusions between which the cylindrical portion extends, and the inner surface of the sleeve define a channel,
wherein at least first, second, third and fourth sets of radial holes are defined in the wall of the sleeve, the first set of radial holes of the sleeve being at least in partial communication with one of the two sets of radial holes of the spool, the second and third sets of radial holes of the sleeve each being at least in partial communication with the channel, and the fourth set of radial holes of the sleeve being at least in partial communication with the other of the two sets of radial holes of the spool;
a first guide member moveable within the valve along an axis of the valve, the first guide member having an axial through-bore;
a second guide member moveable within the valve along an axis of the valve, the second guide member having an axial through-bore;
a connecting member extending through the axial through-bores of the first and second guide members, the connecting member comprising a first end and a second end, the first end being disposed in the axial through-bore of the first guide member, the first end comprising a means for engaging the first guide member, the second end being disposed in the axial through-bore of the second guide member, the second end being connected to the spool; and
a means for urging the first and second guide members apart.

2. The value of claim 1,
wherein the sleeve has a first and second end,
wherein the first set of radial holes of the sleeve is located closer to the second end of the sleeve than the second, third and fourth sets of radial holes of the sleeve,
and wherein the fourth set of radial holes of the sleeve is located closer to the first end of the sleeve than the first, second and third sets of radial holes of the sleeve.

3. The valve of claim 1,
wherein the spool is in an open position, and
wherein the sleeve has a first end and a second end, the second end having an opening for admitting a flow of fluid whose pressure keeps the spool in the open position.

4. The valve of claim 3, further comprising:
a means for biasing the spool into a neutral position, in which an annular protrusion of the plurality of annular protrusions blocks the first set of radial holes of the sleeve, and in which an annular protrusion of the plurality of annular protrusions blocks the third set of radial holes of the sleeve,
wherein the pressure exerted on the spool by the flow of fluid overcomes the force exerted by the biasing means to maintain the spool in the open position.

5. The valve of claim 4, wherein the biasing means is a spring.

6. The valve of claim 4, wherein the engaging means is an annular lip whose diameter is greater than that of a portion of the axial through-bore of the first guide member.

7. The valve of claim 4, wherein the engaging means is an integral part of the connecting member.

8. The valve of claim 4, wherein the engaging means is an annular lip that is an integral part of the connecting member.

9. The valve of claim 1, wherein, when the spool is in an open position, the third set of radial holes of the sleeve is at least in partial communication with the channel.

10. The valve of claim 1, wherein, when the spool is in a neutral position, the third set of radial holes of the sleeve is not in communication with the channel.

11. The valve of claim 1, wherein the engaging means is an annular lip whose diameter is greater than that of a portion of the axial through-bore of the first guide member.

12. The valve of claim 1, wherein the engaging means is an integral part of the connecting member.

13. The valve of claim 1, wherein the engaging means is an annular lip that is an integral part of the connecting member.

14. The valve of claim 1, wherein at least one of the holes of the first set of radial holes of the sleeve is offset from at least one other of the holes of the first set of radial holes of the sleeve.

15. The valve of claim 1, wherein at least one of the holes of the third set of radial holes of the sleeve is offset from at least one other of the holes of the third set of radial holes of the sleeve.

16. A valve comprising:
a sleeve comprising a wall with an inner surface, a first end and a second end, the inner surface defining an axial bore, at least first, second, third and fourth sets of radial holes being defined in the wall of the sleeve;
a spool disposed within the axial bore of the sleeve, the spool comprising:
a wall with an inner surface and an exterior surface, the inner surface defining an axial bore, at least two sets of radial holes being defined in the wall of the spool, the two sets of radial holes at least partially communicating with the axial bore of the spool, the exterior surface of the spool comprising:
a generally cylindrical portion between the two sets of radial holes of the spool,
a plurality of annular protrusions, each being in at least partial contact with the inner surface of the wall of the sleeve, at least one of the plurality of annular protrusions being disposed between one of the two sets of radial holes and the generally cylindrical portion, at least another of the plurality of annular protrusions being disposed between the other of the two sets of radial holes and the generally cylindrical portion, the generally cylindrical portion extending from about one of the plurality of annular protrusions to about another of the plurality of annular protrusions,
wherein the generally cylindrical portion, the annular protrusions between which the cylindrical portion extends, and the inner surface of the sleeve define a channel,
wherein, when the spool is in a neutral position, the first set of radial holes of the sleeve is blocked by an annular protrusion of the plurality of the annual protrusions of the spool, the second set of radial holes of the sleeve is at least in partial communication with the channel, the third set of radial holes of the sleeve is blocked by an annular protrusion of the plurality of the annual protrusions of the spool, and the fourth set of radial holes of the sleeve is at least in partial communication with at least one of the two sets of radial holes of the spool;
a cap having an axial bore, wherein the first end of the sleeve is disposed inside the axial bore of the cap and is connected to the cap,
a generally tubular first guide member disposed within the axial bore of the cap and movable within the axial bore of the cap, the first guide member having an axial through-bore;
a generally tubular second guide member disposed within the axial bore of the cap between the first guide member and the spool, the second guide member having an axial through-bore that is approximately aligned with the axial through-bore of the first guide member;
a generally cylindrical connecting member disposed within the axial bore of the cap and extending through the axial bores of both the first and second guide members, the generally cylindrical guide member, the connecting member having
a first end disposed in the axial through-bore of the first guide member, the first end having an annular lip whose diameter is greater than that of a portion of the axial through-bore of the first guide member, and
a second end that disposed in the axial through-bore of the second guide member and is connected to the spool; and
a means for urging the first and second guide members apart.

17. The valve of claim 16, wherein the urging means is a spring.

18. A valve comprising:
a sleeve having a wall with an inner surface, the inner surface defining an axial bore, the sleeve wall having at least a first, a second, a third and a fourth set of radial holes;
a spool disposed within the axial bore of the sleeve, the spool having a wall with an inner surface defining an axial bore, a first end, and a second end, the spool having an exterior surface, at least two sets of radial holes being defined in the wall of the spool, the two sets of radial holes at least partially communicating with the axial bore of the spool,
wherein the exterior surface of the spool comprises at least three annular protrusions spaced apart from one another, wherein one of the three annular protrusions is located at an intermediate position between the other two annular protrusions, another of the three annular protrusions is located closer to the second end of the spool than the other two annular protrusions, and the remaining one of the three annular protrusions is located closer to the first end of the spool than the other two annular protrusions,
wherein one of the two sets of radial holes of the spool is located between the annular protrusion at the intermediate position and the annular protrusion that is closer to the first end of the spool,
wherein the other of the two sets of radial holes is located between the annular protrusion that is located closer to the first end of the spool and the first end of the spool,
wherein the generally cylindrical portion extends from about the annular protrusion that is closer to the second end of the spool to about the annular protrusion located at the intermediate position, and wherein the generally cylindrical portion, the two annular protrusions between which the cylindrical portion extends, and the inner surface the sleeve define a channel,
wherein the first and second sets of radial holes of the sleeve are at least in partial communication with the channel, the third set of radial holes of the sleeve is at least in partial communication with one of the two sets of radial holes of the spool, and the fourth set of radial holes of the sleeve is at least in partial communication with the other of the two sets of radial holes of the spool;
a cap having an axial bore, wherein the first end of the sleeve is disposed inside the axial bore of the cap and is connected to the cap;
a generally tubular first guide member disposed within the axial bore of the cap and movable within the axial bore of the cap, the first guide member having an axial through-bore;
a generally tubular second guide member disposed within the axial bore of the cap between the first guide member and the spool, the second guide member having an axial through-bore that is approximately aligned with the axial through-bore of the first guide member;
a generally cylindrical connecting member disposed within the axial bore of the cap and extending through the axial-through bores of both the first and second guide members, the connecting member comprising a first end and a second end, the first end extending out from the axial through-bore of the first guide member, the first end having an annular lip whose diameter is greater than that of a portion of the axial through-bore of the first guide member, the second end extending out from the axial through-bore of the second guide member, the second end being connected to the spool; and a means for urging the first and second guide members apart.

19. The valve of claim 18, wherein the spool is in an open position, wherein the cap has a radial hole, wherein the radial hole of the cap at least partially communicates with the axial bore of the cap, and wherein a fluid path is defined from the radial hole of the cap, through the axial bore of the cap, and to the spool to allow the passage of a flow of fluid whose pressure maintains the spool in the open position.

20. The valve of claim 19, further comprising:

a means for biasing the spool into a neutral position, in which an annular protrusion of the plurality of annular protrusion blocks the first set of radial holes of the sleeve, and in which an annular protrusion of the pluraliy of annular protrusion blocks the third set of radial holes of the sleeve, wherein the pressure exerted on the spool by the flow of fluid overcomes the force exerted by the biasing means to maintain the spool in the open position.

21. The valve of claim 20, wherein the biasing means is a spring.

22. The valve of claim 18, wherein the urging means is a spring.

23. A valve comprising:

a sleeve having a first and a second end, an opening at the second end, at least a first, a second, a third and a fourth set of radial holes, a wall with an inner surface defining an axial bore;

a spool disposed within the axial bore, the spool having a wall with an interior surface defining an axial bore and an exterior surface, the spool wall having at least a first set, a second set, and a third set of radial holes at least partially communicating with the axial bore of the spool the exterior surface of the spool wall comprising:

at least a first, a second, a third, a fourth and a fifth annular protrusion, the first set of radial holes of the spool wall being located between the first and second annular protrusions, the second set of radial holes of the spool wall being located between the second and third annular protrusions, and the third set of radial holes of the spool wall being located between the fourth and fifth annular protrusions, a generally cylindrical portion extending from about the second annular protrusion to about the third annular protrusion, and wherein the generally cylindrical portion, the second annular protrusion, the third annular protrusion, and the inner surface of the sleeve define a channel; and a cap having an axial bore and a radial hole, wherein the first end of the sleeve is disposed inside the axial bore of the cap, and is connected to the cap, wherein the radial hole of the cap at least partially communicates with the axial bore of the cap, and wherein a fluid path is defined from the radial hole of the cap, through the axial bore of the cap, and to the spool;

wherein the spool is movable within the axial bore, the spool having at least:

a neutral position, in which the third annular protrusion blocks the third set of radial holes of the sleeve and the fourth annular protrusion blocks the first set of radial holes of the sleeve, a first open position in which the first set of radial holes of the sleeve is at least in partial communication with one of the three sets of radial holes of the spool, the second and third sets of radial holes of the sleeve are each at least in partial communication with the channel, and the fourth set of radial holes of the sleeve is at least in partial communication with another of the three sets of radial holes of the spool, and a second open position, in which the first and second sets of radial holes of the sleeve are at least in partial communication with the channel, the third set of radial holes of the sleeve is at least in partial communication with one of the three sets of radial holes of the spool, and the fourth set of radial holes of the sleeve is at least in partial communication with another of the three sets of radial holes of the spool.

24. The valve of claim 23, wherein the first set of radial holes of the sleeve is located closer to the second end of the sleeve than the second, third and fourth sets of radial holes of the sleeve, and wherein the fourth set of radial holes of the sleeve is located closer to the first end of the sleeve than the first, second and third sets of radial holes of the sleeve.

25. The valve of claim 24, wherein the sleeve has a first set of auxiliary holes near the first set of radial holes, and a second set of auxiliary holes near the third set of radial holes, when the spool is in its neutral position, the first set of auxiliary holes is at least partially aligned with the third set of radial holes of the spool, and the second set of auxiliary holes is at least partially aligned with the second set of radial holes of the spool.

26. The valve of claim 24, further comprising:

a means for biasing the spool into the neutral position, wherein when pressure exerted on the spool by a flow of fluid entering the valve through the opening at the second end of the sleeve overcomes a force exerted by the biasing means, the spool moves to its first open position.

27. The valve of claim 26, wherein the biasing means is a spring.

28. The valve of claim 23, further comprising:

a means for biasing the spool into the neutral position, wherein when pressure exerted on the spool by a flow of fluid entering the valve through the opening at the second end of the sleeve overcomes a force exerted by the biasing means, the spool moves to its first open position.

29. The valve of claim 28, wherein the biasing means is a spring.

30. The valve of claim 23, wherein a first annular groove is defined in the third annular protrusion, the first annular groove having a small radial hole in communication with the axial bore of the spool, a second annular groove is defined in the fourth annular protrusion, the second annular groove having a small radial hole in communication with the axial bore of the spool, and wherein when the spool is in its neutral position, the first annular groove is at least in partial communication with the third set of radial holes of the sleeve, and the second annular groove is at least in partial communication with the first set of radial holes of the sleeve.

31. A method for regulating the flow of fluid through a valve comprising a generally tubular sleeve having at least a first, a second, a third and a fourth set of radial holes; and a spool having axial bore and being disposed within the sleeve, a channel being defined between the spool and the sleeve, a first guide member moveable within the valve along an axis of the valve, the first guide member having an axial through-bore; a second guide member moveable within the valve along an axis of the valve, the second guide member having an axial through-bore; a connecting member extending through the axial through-bores of the first and second guide members, the connecting member comprising a first end that is disposed in the axial through-bore of the first guide member, the first end including a means for engaging the first guide member, and a second end that is disposed in the axial through-bore of the second guide member and that engages the spool; and a means for urging the first and second guide members apart, the method comprising:

accepting a pilot flow into the valve;

passing the pilot flow to a point near the spool, thereby causing the spool to move along the axis of the sleeve so as to unblock at least one of the sets of the radial holes of the sleeve;

the connecting member moving in response to the movement of the spool and disengaging the first guide member;

the second guide member moving in response to the spool and exerting a force on the urging means;

the urging means counterbalancing the force;

admitting a fluid through the second set of radial holes and into the channel;

passing the fluid through the channel and to the third set of radial holes;

allowing the fluid to exit the valve at the third set of radial holes and pass to a hydraulic device;

admitting the fluid from an outlet of the hydraulic device, through the fourth set of radial holes, and to the axial bore of the spool;

passing the fluid through the axial bore of the spool and to the fourth set of radial holes; and allowing the fluid to exit the valve at the fourth set of radial holes.

32. The method of claim 31, wherein the steps are performed in a first mode of operation of the valve, and wherein, in a second mode of operation of the valve, the method further comprises:

admitting a fluid through the second set of radial holes and into the channel;

passing the fluid through the channel and to the first set of radial holes;

allowing the fluid to exit the valve at the first set of radial holes and pass to a hydraulic device;

admitting the fluid from an outlet of the hydraulic device, through the third set of radial holes, and to the axial bore of the spool;

passing the fluid through the axial bore of the spool and to the fourth set of radial holes; and allowing the fluid to exit the valve at the fourth set of radial holes.

33. The method of claim 32, further comprising, in the second mode of operation, the steps of:

the spool disengaging the second guide member;

the connecting member moving in response to the movement of the spool and engaging the first guide member;

the first guide member exerting a force on the urging means; and the urging means counterbalancing the force.

34. The method of claim 31, wherein the urging means is a spring.

35. The method of claim 31, wherein the engaging means is an annular lip whose diameter is greater than that of a portion of the axial through-bore of the first guide member.

36. The method of claim 31, wherein the engaging means is an integral part of the connecting member.

37. The method of claim 31, wherein the engaging means is an annular lip that is an integral part of the connecting member.

* * * * *